United States Patent
Burnett (10) Patent No.: US 7,568,097 B2
(45) Date of Patent: Jul. 28, 2009

(54) METHOD FOR FILE SYSTEM SECURITY BY CONTROLLING ACCESS TO THE FILE SYSTEM RESOURCES USING EXTERNALLY STORED ATTRIBUTES

(75) Inventor: Rodney Carlton Burnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/735,003

(22) Filed: Dec. 12, 2003

(65) Prior Publication Data

US 2004/0128556 A1    Jul. 1, 2004

Related U.S. Application Data

(62) Division of application No. 09/826,984, filed on Apr. 5, 2001, now Pat. No. 6,766,314.

(51) Int. Cl.
*H04L 9/00* (2006.01)
(52) U.S. Cl. ........................ 713/165; 711/207
(58) Field of Classification Search ................ 713/165; 711/207

See application file for complete search history.

(56) References Cited

U.S. PATENT DOCUMENTS

| | | | | |
|---|---|---|---|---|
| 3,723,976 A * | 3/1973 | Alvarez et al. | ............... | 711/207 |
| 4,215,407 A * | 7/1980 | Gomola et al. | ................ | 700/95 |
| 4,761,737 A * | 8/1988 | Duvall et al. | ................ | 711/209 |
| 5,093,779 A * | 3/1992 | Sakurai | .......................... | 707/1 |
| 5,625,818 A * | 4/1997 | Zarmer et al. | ............. | 707/104.1 |
| 5,724,512 A * | 3/1998 | Winterbottom | .............. | 709/226 |
| 5,771,379 A * | 6/1998 | Gore, Jr. | ...................... | 707/101 |
| 6,023,715 A * | 2/2000 | Burkes et al. | ................ | 715/514 |
| 6,415,280 B1 * | 7/2002 | Farber et al. | .................... | 707/2 |
| 7,107,591 B1 * | 9/2006 | Karp et al. | ................... | 718/104 |

* cited by examiner

*Primary Examiner*—Kambiz Zand
*Assistant Examiner*—James Turchen
(74) *Attorney, Agent, or Firm*—Jeffrey LaBaw; Darcell Walker (57) ABSTRACT

The present invention is an algorithm that manages the ability of a user or software program to access certain protected file resources. This invention describes a method for file system security through techniques that control access to the file system resources using externally stored attributes. This invention accomplishes the described objectives in file system security by creating an external database containing auxiliary attributes for objects in the file system. During a file access attempt, an identifier of this file will be matched against a set of protected files in a security database. If that file is not in the database, there is not protection on the file and requester will be allowed to access the file. If a match does show that the file is protected there will be a determination as to whether the requester will be allowed access to the file. The basis for this access determination will be a set security rules defined in the external security attribute. This invention incorporates techniques and algorithms for attribute attachment, storage and organization of the associations to these attributes, and subsequent recognition of attached attributes. In this approach, the attributes would define authorization policy for controlling access to objects in the file system.

5 Claims, 7 Drawing Sheets

Example High Level Architecture Relationship between an External Authorization Manager
and the Described Fid Association and Recognition Mechanism

METHOD FOR FILE SYSTEM SECURITY BY CONTROLLING ACCESS TO THE FILE SYSTEM RESOURCES USING EXTERNALLY STORED ATTRIBUTES

CROSS-REFERENCE TO RELATED APPLICATION

This application is a divisional application of and claims priority from patent application Ser. No. 09/826,984, filed on Apr. 5, 2001 now U.S. Pat. No. 6,766,314, the contents of which are incorporated herein by reference.

FIELD OF THE INVENTION

The present invention relates generally to a technique for controlling access to file system resources using externally stored attributes. More specifically this invention describes a technique in which an externally stored attribute, such as an authorization security policy, uses a file system identifier to determine access to a file system resource associated to that file system identifier.

BACKGROUND OF THE INVENTION

File systems, in operating system environments, such as UNIX, have evolved into complex implementations with many features. These file systems present a hierarchical tree view of a file name space and support large amounts of data and numbers of objects at very high performance levels. Yet, one characteristic that has changed little is the authorization security models of these file systems. The fundamental problem is that, on operating systems such as UNIX, LINIX and even to some degree WINDOWS, the degree to which the native file systems do not support robust security models. For example, with UNIX, the security of an individual file may be specified is fairly limited in coarse grain. A user and a group owns the file. In this model, file access is based on a set of "mode" bits that grant permissions based on the file object's owning user and group. Some file systems support a more robust security model based on access control lists (ACLs) where more security is placed on a file to enable control of various users' access to files. The problem with this approach is that these models are very different across different versions of operating systems. This inconsistency leads to another problem that each system requires individual and separate administration of each system and each system requires a separate set of administration methods. When viewing the Information Technology ("IT") infrastructures of large corporations and other entities, there is a growing need for stronger more granular security controls in file systems. This need is driven by large-scale commercial usage of these file systems, data sharing with Internet based applications, an increased focus on IT security, and the desire to control IT administration costs. From an IT cost perspective, there is a need to have enhanced security in an efficient way. This objective leads itself to being able to define the security rules and procedures centrally for all of an entity's systems that could be accessed so that there would be a central point of administration, control and verification of rules. The IT structures of today need better security and a more efficient way to implement the security. An efficient way to do that is to provide a file system security model that can be applied uniformly across a large number of systems using a centrally managed set of policies that is administered identically regardless of the target file system implementation or hardware platform.

Ideally, it would be desirable to add extended attributes describing properties such as authorization policy to the file system object's attributes. However, file systems, such as UNIX, are typically byte stream oriented and do not support mechanisms to add attributes beyond the classic UNIX attributes which are typically the object's owner, size, modification and access times, and mode bits.

A set of techniques is needed which allows unique identification of an accessed resource regardless of way in which it was accessed. In addition, the techniques must allow the specification of attributes in terms of an object's common path name in a manner that maps to the same unique file system resource regardless of the representation used at access time. These techniques should be efficient so they impose minimal impact the file system's native performance characteristics. They must allow for quick recognition and processing of attached attributes at access time. They must also accommodate changes in defined attributes and object changes in the file systems to which they are applied.

SUMMARY OF THE INVENTION

It is an objective of the present invention to provide a method for controlling access to named objects in a file system.

It is a second objective of the present invention to provide a method for associating external attributes defining authorization policy to named objects in a file system.

It is a third objective of the present invention to recognize the existence of an associated external file system authorization policy and provide for the evaluation and enforcement of that policy at the time of access to a file system object.

It is a fourth objective of the present invention to provide for the association, recognition, and processing of external attributes utilizing file system object file identifiers.

It is a fifth objective of the present invention to provide a means for the generation of object file identifiers when the native operating system for a particular file system does not provide these identifiers.

It is sixth objective of the present invention to allow for the processing of the externally defined policy by a resource manager based on associations to the original file name without requiring the resource manager to have knowledge of the underlying association and recognition techniques that utilize file identifiers (FIDs).

This invention describes a method for file system security through techniques that control access to the file system resources using externally stored attributes. This invention accomplishes the described objectives in file system security by creating an external database containing auxiliary attributes for objects in the file system. This solution incorporates techniques and algorithms for attribute attachment, storage and organization of the associations to these attributes, and subsequent recognition of attached attributes. In this approach, the attributes would define authorization policy for controlling access to objects in the file system. Such a solution would require techniques for associating the defined policy with file system objects, detecting accesses to the objects, locating the appropriate attributes at access time, and then processing the attributes to produce an access decision for granting or denying access to the accessed resource.

Administratively, the most convenient technique for defining authorization rules for a file system object is to associate the attributes with the object's fully qualified common name. This common name is also known as the path name to the file. UNIX file systems, for example, provide a hierarchical name space for constructing object names. For example, a file called mydata might have a fully qualified path of /home/john_doe/data_files/mydata. This path is the most recognizable representation of the object and the most convenient description for an administrator to use when defining new attributes for the object. Therefore the technique for associating (or attaching) attributes should support using the object's fully qualified pathname.

Recognizing and locating externally defined attributes for a file system object at the time of object access poses significant technical challenges. Accesses occur through a set of available programming Application Programming Interfaces ("APIs") that provide several ways to identify the object being accessed. For many APIs, the name of the object is provided. However, this name is often not the full path name starting from the top or "root" of the file hierarchy. Instead, the name is relative to a "current directory" that is tracked for the calling application by the native operation system. UNIX file systems also commonly contain support for creating alternate names to an object using symbolic or hard links. This provides alias names to the same object. A symbolic link might allow /home/john_doe/data_files/mydata to be accessed as /u/jdoes_data/mydata. These variations make it difficult to locate the externally defined attributes using the provided name at the time of access. There are also APIs that do not take a pathname as input. Instead they take an integer number known as a file descriptor, which was obtained in an earlier name based function. It is desirable to intervene in and enforce policy on these APIs as well.

The present invention is described in the context of a resource manager embodying the techniques of the invention. The resource manager enforces authorization policy for file system resources. The policy resides external to the native operating system and is defined using full path names for the target file system resources to be protected. These names are referred to as protected object names or PONs. An example PON would be /home/john_doe/data_files/mydata. The policy can reside in a database on the system where the resources reside, or it could reside in a network of computers. The resource manager would be comprised of components for 1) retrieving the policy, 2) intervening in accesses to the objects to be protected, 3) collecting the access conditions such as the accessing user and the attempted action, and 4) producing an authorization decision based on the policy, the accessed object, and the access conditions. Those skilled in the art will recognize that systems with these characteristics can be constructed and that they could exist in many variations including a distributed application in a network of computing devices.

When the described resource manager starts, it first retrieves the authorization policy and then preprocesses the named protected files into their equivalent file identifier "FID" mappings. A FID is a binary representation that uniquely defines a physical file system object that resides in a file system. The manager then creates a database of FID to name mappings and potentially other properties that may facilitate processing at access time. For example, those properties could include the policy itself in the form of access control lists (ACLs) or hints about how the resource is protected. Potentially the resource manager could store the processed FID mappings and reuse them on subsequent starts instead of re-processing the name based authorization policy. The database of FID mappings could be organized in a variety of ways. The FID's numerical nature would allow for hashing techniques that would enable efficient searches using FID data as the search key.

When an object access is attempted through one of the access paths the resource manager will intervene. The resource manager uses available operating system services to process the API's provided description of the target file resource into its underlying data structure representation. This description could be the fully qualified path name, a relative path name, an alternate name such as a hard or symbolic line, or a non-name based description such as an integer UNIX file descriptor. Additional provided services or techniques are then used to produce a corresponding FID. The FID is then used to search the FID mapping database looking for a match. If a match is found, then the PON and any other included properties are provided to the decision-processing component of the resource manager to produce an access decision. The resulting decision is then enforced by the intervention component, which either permits or denies the resource access.

With these described techniques, the resource manager is able to efficiently associate defined policy with physical protected file system objects. It can then quickly recognize the existence of relevant policy at the time of object access regardless of how the object was accessed. Once recognized, the retrieved FID to PON mapping can by used to consult the decision component of the resource manager for an access decision that can then be enforced.

DETAILED DESCRIPTION OF THE INVENTION

The present invention is described in the context of a UNIX or UNIX type operating system. The invention describes a set of techniques and algorithms that achieve the objectives of file system object security through the use of a unique representation of a file system object known as a file identifier, or FID. A FID is a binary representation that uniquely defines a physical file system object that resides in a file system. The FID is typically a stream of bytes of arbitrary length that is commonly as small as eight to ten bytes in size. The contents of the FID bytes are often numerical in nature with the first set of bytes holding an index or "inode" number and the remaining bytes holding a generation or use instance of the inode. FIDs are used in present day operating systems for the implementation of network file sharing services. A file server process running on a file system server machine housing data will obtain a FID for a file when client machine on a network searches for the file by name. The server will then return the FID to the client. The client sends the FID in subsequent requests to the server to perform operations on the file such as reading or writing data. The server uses the FID to quickly find the file system object's data structure and perform the operation. Thus, in a network file system implementation, the FID acts as an alternate representation that can be quickly mapped to the object's defining data structure, which often is an inode/vnode. Inode and vnode are used synonymously in this description. The vnode is an in-memory object that usually has a short lifetime and is frequently recycled for use by other accessed file objects. However, the FID allows fast construction of a vnode for the unique physical file system object it describes.

The numerical nature, typically small size, and unique mapping to an individual file system object make the FID a powerful association tool. Given that the FID represents a single instantiation of an object, it also represents a unique mapping for any of the potential pathnames or alternate descriptors that can be used by an application to access the object. Thus, a FID can be used as an efficient bi-directional mapping equivalent of file system object and any of its names.

Figure 5:
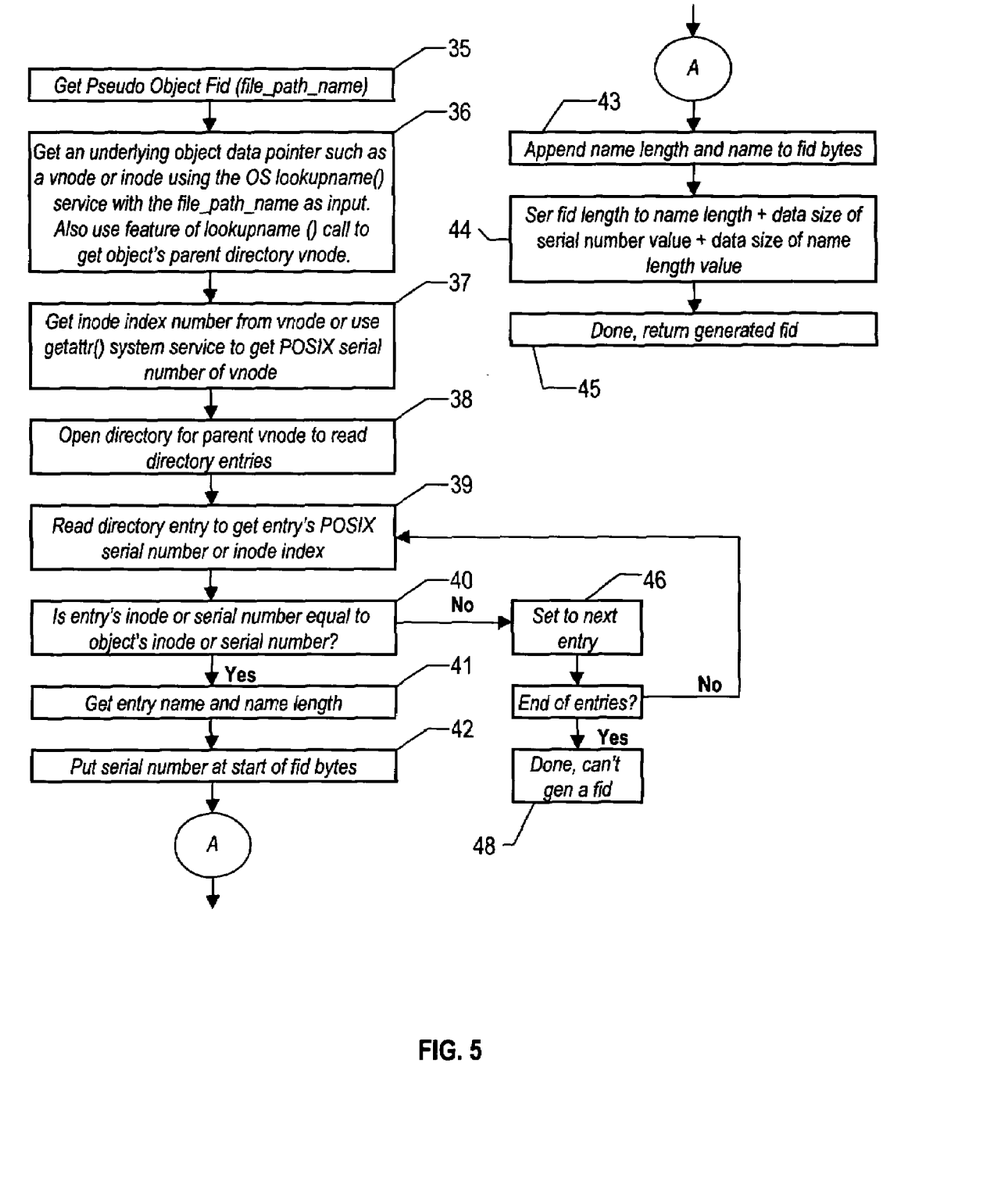
FIG. 5 is a flow diagram of steps for generating a FID in the absence of a provided file system service to do so.

Different file systems use different techniques to create a FID that uniquely represents the object. Most implementations found on modern systems provide programming services to retrieve FIDs. For systems that do not provide these services, a technique can be used to generate an acceptable "pseudo" FID indirectly from other services and direct access to data structures. Such a technique is illustrated in FIG. 5 and discussed in this description. A common procedure for retrieving a FID for an object would first involve obtaining a file system object data structure based on how the object was accessed. On most UNIX systems, this data structure is commonly called a vnode. However, it could vary across implementations. For example, on Linux or some older systems it might be called an inode. If a resource is accessed by a full or partial name, a native kernel service is used which efficiently returns a vnode (or inode, etc.) from the name. That native system utilizes internal state and usually name based caches to quickly produce the vnode. In the case of non-name based access paths, there usually exists services or accessible data structures to obtain the vnode from an integer file descriptor. Once the vnode is obtained, the FID is retrieved or generated using services that operate on the vnode. This FID is then used to identify file objects being accessed.

Figure 1:
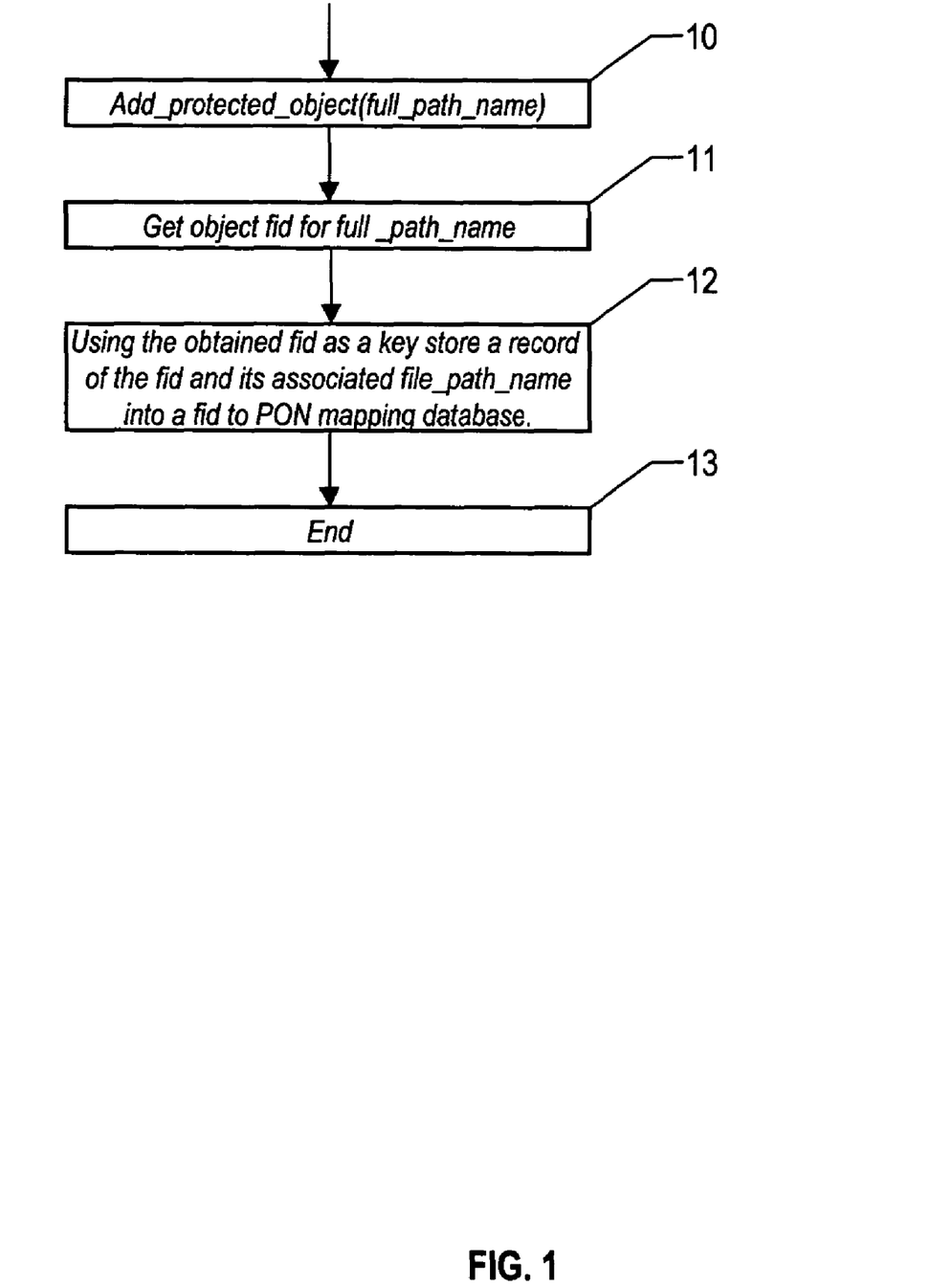
FIG. 1 is a flow diagram of the steps involved in processing an authorization policy record that is described using the objects fully qualified path name or PON.

Referring to the implementation of the invention in FIG. 1, described is the set of steps involved in processing an authorization policy record for the object's fully qualified path name or PON (the protected object name) which is the full path to the file. This process describes how one would take the protected object name and process it into the new database that maps the unique file identifiers (FIDs) back to the full name of the file and place that relationship into the mapping database. In step 10, the file name is taken as an input. Step 11 retrieves a file identifier from the inputted file name, which corresponds to that file path name. This step produces a very unique definition or identifier (FID) for the file object that is described by that file name in step 10. The step 11 is implemented using services provided by the native operating system or through techniques of this invention illustrated in FIG. 5 in the event the native operating system does not provide the services. Step 12 uses the obtained file identifier as a key to store a record of the FID and its associated file_path_name in a FID to protected object name (PON) mapping database. This database could be stored in memory, on disk or other storage mechanism. The result is that now there is a mapping for translation between this unique file identifier and this name that is stored in a master database of security rules. At this point, the procedure ends, step 13.

Figure 2:
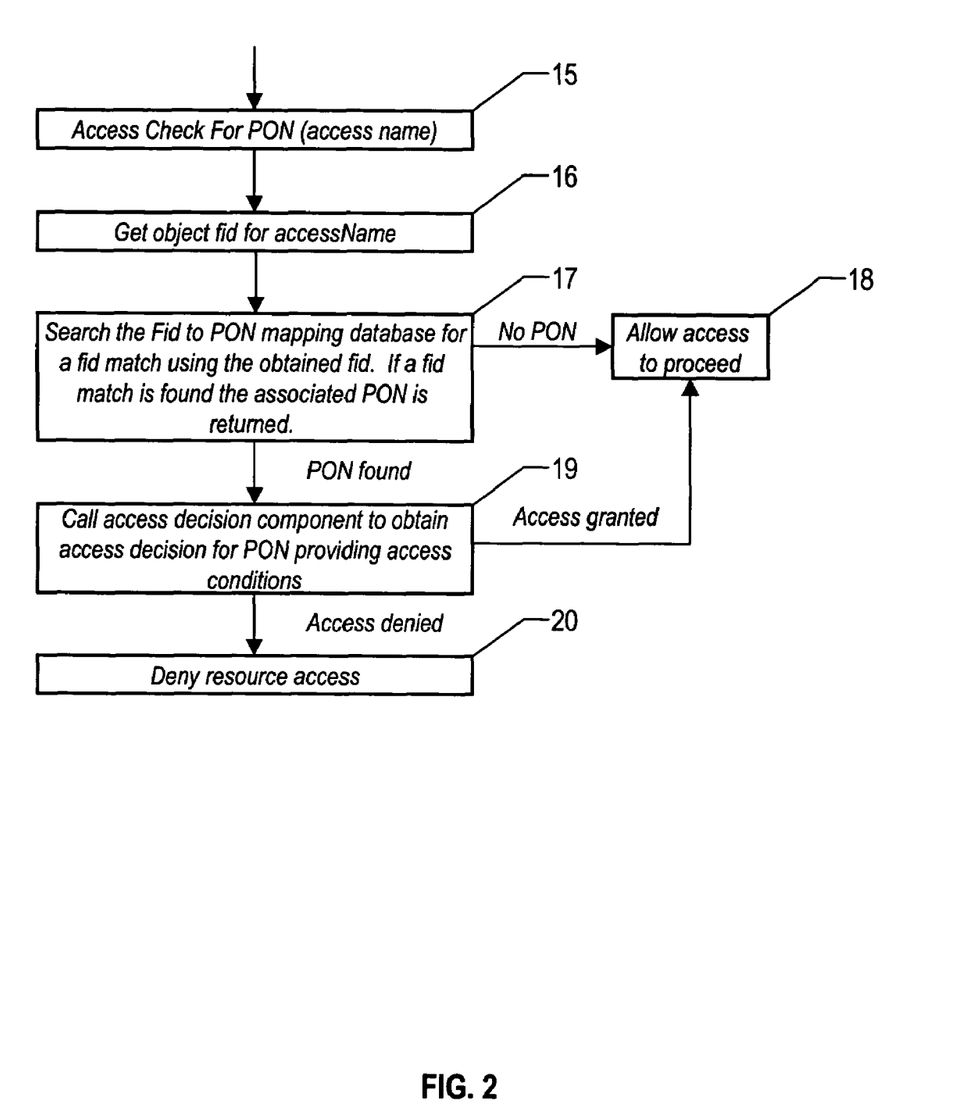
FIG. 2 is a flow diagram of the steps to generate a FID for a provided access path to a file system object and determine if the accessed object is protected by authorization policy. If so, then an access decision is sought.

FIG. 2 illustrates the process that occurs when an application attempts to access a file and some mechanism in the resource manager that enforces security on the file intercepts or detects that access attempt. As part of detecting that access attempt, the detecting mechanism wants to determine if that accessed file is actually protected by the resource manager. During the access, a name was used to identify the requested file. Step 15 begins the process of checking for a protected object name for the file being accessed. In step 16, the process obtains a FID for that name used to access the file. As previously stated, this FID can be obtained through services provided by the native operating system of by techniques implemented when the operating system does not provide the services. After obtaining the FID, the next step in box 17, is to use that FID as a key, to search the created mapping database to see if that FID actually exists in the mapping database. If the FID does exist in the database, the associated protected object name is extracted from that record. If the search does not produce a protected object name, then the access attempt is allowed as shown in step 18. In this case, the external security manager does not protect the particular file being accessed. The access of the file is allowed to proceed. If the search in step 17 does produce a protected object name, the process proceeds to step 19. This step makes a call to the decision-making component of the resource manager and obtains a security access decision for that PON. Because the decision-making component of the resource manager is connected to the master database, having the full name allows that security-making component to retrieve the specific protections for the file that an application is attempting to access. Once the decision-making component has the specific protections, it can make a decision whether to allow access to the file by the requesting application. If the security decision is to grant access, then to operation proceeds to step 18. If the security decision were to deny access, the component that detected the access attempt would deny access in step 20. The decision to allow access is based on the set of security rules defined in the external security database.

Figure 3:
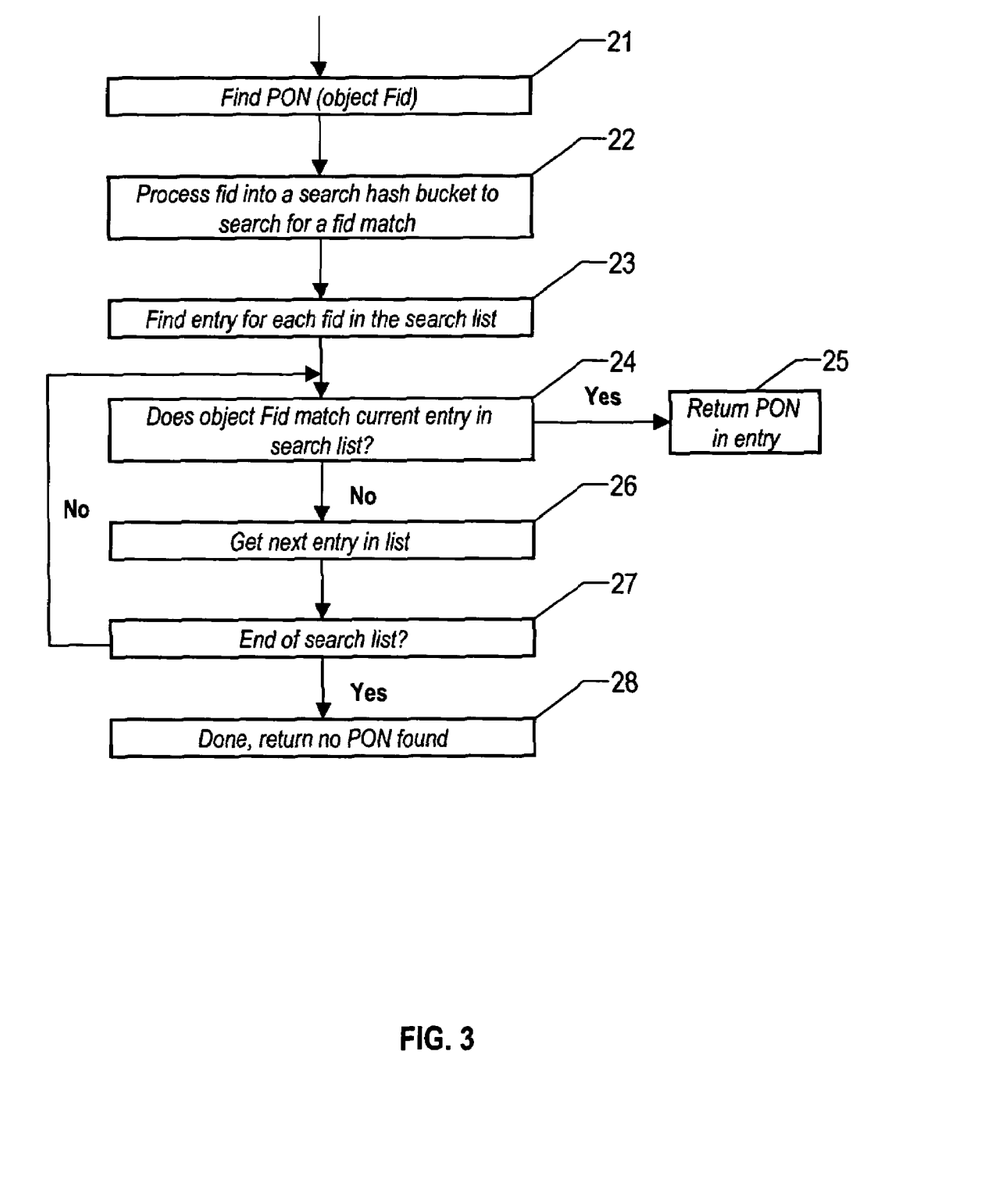
FIG. 3 is a flow diagram of the steps to search the FID to PON mapping database provided a search FID as the key.

FIG. 3 is a more detailed illustration of step 17, which shows a set of steps to search the FID to PON mapping database to determine if the file name requested is protected. In the first step, shown in step 21, there would be an identification of the FD that would be used as the search key. In step 22, the FID would be processed into a search hash bucket or list to find a FID match. A common practice in computing and software programming for databases is to take the information and process it into a list or index. For example, in the protection of thousands of objects, one means to speed up a search would be to divide those objects up into a hundred buckets. After this sorting exercise, some additional processing occurs to determine in which bucket one should initially search. The criteria for this decision could be based on any number of parameters.

The step 23 proceeds to search the list to determine if there is an entry that matches the desired FID. The process takes the first entry in the list and compares that entry to the object FID in step 24. If the object FID matches the entry in the list, then there is a match and the PON for that FID in the list is returned as illustrated in step 25. If in step 24, the current entry does not match the object FID, the process moves to the next entry in the list, step 26. The step 27 determines whether the end of the list has been reached, which would mean there was no next entry. If not, then the procedure returns to step 24 and there is a comparison of the next entry in the list with the object FID. If in step 27, the end of the list is reached, then the search yielded no PON indicating the file resource represented by the provided FID has no external security policy. The operation then terminates, step 28.

Figure 4:
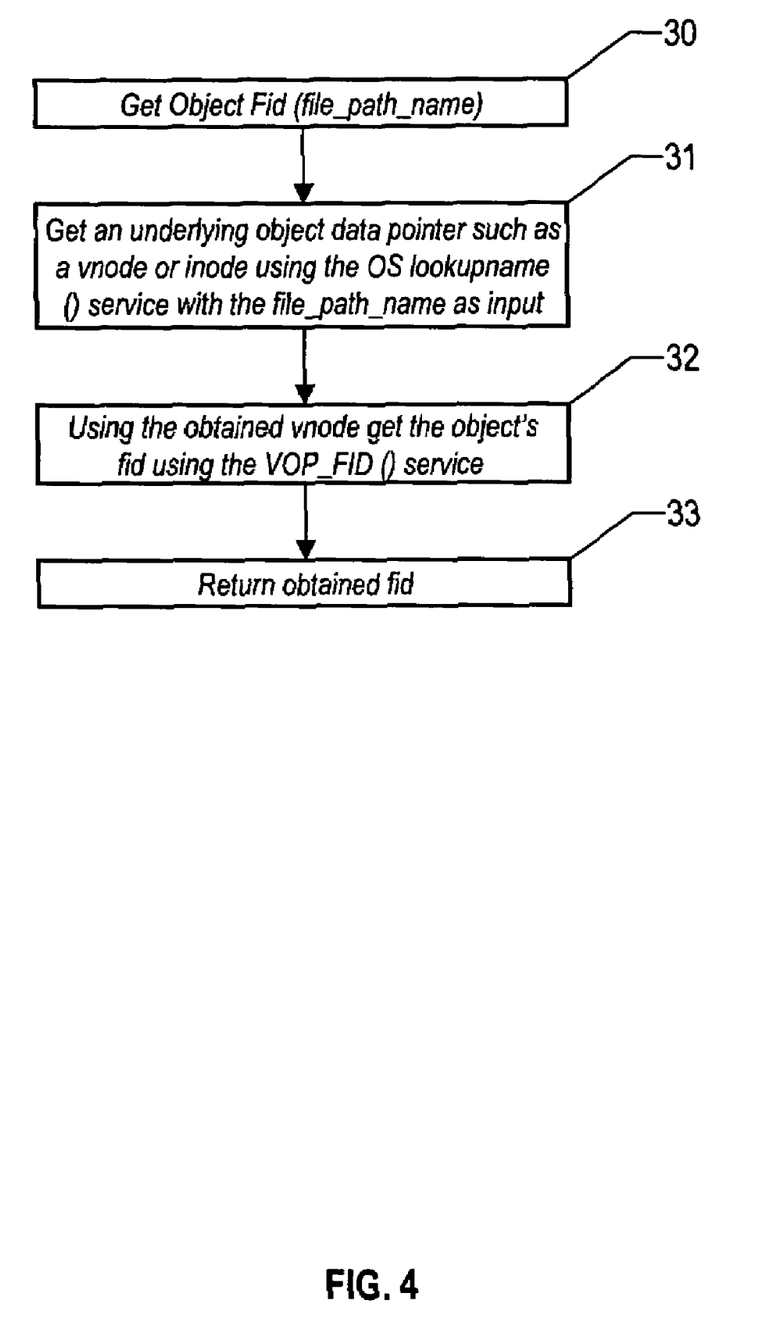
FIG. 4 is a flow diagram of steps for generating a FID using provided file system services.

FIG. 4 is a flow diagram showing how to retrieve a file identifier (FID) for a given file path name using services that are provided by the native operating system. In step 30, process starts with valid file resource name as input. The name could be any of the valid names for the resource, which may include a full path name, a name relative to the caller's current directory context. The step 31 gets an underlying object data pointer such as a vnode or inode using an operating system lookupname( ) service with the file path name used as the input. The UNIX operating systems that exist and the operating systems that are like UNIX (specifically LINIX) has the same "lookupname" capabilities. With this service, if the service is given a name associated with the file for which one is searching, the service will produce a reference to a data structure that is typically called a vnode or an inode. These data structures can contain a lot information about the files and access to a number of different operations one can perform on a file. It is necessary to take the name describing the desired file system resource and produce one of these data structures.

Once there is a data structure such as a vnode, one operation that can be performed with the vnode as input to the operating system is a request for a file identifier for the file resource that the vnode represents step 32. In this request, the operating system interface VOP_FID( ) is called to retrieve a FID. The interface produces and returns a data structure that is a FID. The FID has as one of its members a field of the number of bytes in the FID and after that field is the number of bytes that is unique signature for that file. After obtaining the FID, the obtained FID is retained in step 33.

FIG. 5 describes a method of producing a FID when the native operating does not provide a service generate a FID. In step 36, the process begins by obtaining an underlying object data pointer. This data pointer could be a data structure known as a vnode or an inode. A feature of the native operating system called "lookupname" is a service that retrieves this object pointer based on the full path name of the file system object. With this technique there is an assumption that with a name one can always get some sort of data representation of the underlying file. Most if not all operating systems provide at least this amount of functionality. These lookupname services will typically provide a way to get a data structure for the requested file resource and a data structure that represents the parent directory in which that file resource resides. For example, there could be an inquiry about a file with a name such as /users/john/temp/myfile. The request would be for one of the data structure vnodes for the file called for "myfile" and for the service to give the data structure that represents the directory called "temp". This directory is the directory location of the file called myfile. The retrieved information would be about the file (myfile) and the parent directory (temp). The two pieces of information are used in the next step 37 to obtain a physical file location.

The data structures that describe these files each have some physical trait about the file. Files are represented in operating systems one of one several ways: A very common piece of data is some address on the disk where the file is located such as a disk block address or a disk sector. In this representation, there will be some unique address information that is specific to the location of that file in the file system. In UNIX operating systems, this specific location information is a value called an inode or vnode index, which is just a number that starts at one and goes up to the number of objects in that file system. This number is an index to a series of disk block addresses with index one representing the first disk address in the sequence, which holds information representing an individual file resource. This number will be a field in that data structure.

Some operating systems have a data structure that does not contain an inode index number or have a data structure that is inadequate for the desired operations of this invention. These operating systems cannot provide an inode index for the location of the desired file. In this case, a programming interface called "get attributes" (getattr( )) is used to obtain specific file information. This programming interface will take the vnode or inode data structure as input for the file and return a data structure with a lot of attributes or properties of the file. One of those properties will be the file serial number. UNIX operating system file systems conform to a standard known as "POSIX" that governs programming interfaces. The premise for this POSIX standard is that for a given file resource that is being accessed, there must be some programmatic interface available in order to get a unique serial number for that file. This serial number is referred to as the POSIX serial number. Therefore, if the unique number information (inode) is not available in the data structure, then the operating system program interface is used to get a unique number (the serial number) for this file. No other file that currently exists in that file system will have that number. This serial number is usually in the form of a disk address or some value that relates to a disk address. Often, it is actually the inode or an equivalent that was not directly obtainable from a platform implementation's vnode or inode data structure.

The above obtained inode index, serial number, or disk address information tells of a location where the file resides in a file system. However this information alone is not a unique description of the resource and is not enough to construct a FID. The location information is only valid for the current instantiation of a named file resource. If the resource is deleted, the location becomes available for use by a subsequently created resource. If that resource has a different name, then the location no longer represents a resource with the name of the previously removed resource. If the previous resource is recreated with the same name, it may allocated another location.

The next portion of the technique, in FIG. 5, begins the process of getting the second piece of information that will make this definition very unique for that given instant of the file in the system. As long as that file resource stays on the system, this file identifier (FID) will be uniquely tied to that file. Now that there is a known file location number for that file resource, the way to make this file identifier unique is to couple this file location number with the name of the file resource. The identifier will have the name of the file and the physical location number where the file resides. In the example file path name, /users/john/temp/myfile, myfile is the name of the file. In practice, the information received may not be the full path name. For instance, the information may be a partial path file name or a file descriptor.

Referring to step 38 in order to get the file name, the vnode or inode data structure for the directory in which the file resides is used to open the directory in order to read information contained in that directory. The directory has a list of entries with locations where all file resources contained in that directory reside. Each directory entry will have the name of the particular resource and will have the inode index or the serial number for that entry's resource. Once the directory is opened, the next step in step 39 is to read the first directory entry for this directory to get the inode index or the POSIX serial number for the file location. Step 40 determines whether the inode index of the entry is equal to the inode index determined in step 37. If the two inode indexes are equal, the next step is to retrieve the name of the resource out of the entry and the length of the name step 41. In the previous example the name would be "myfile". The length of the name is in that entry location or can be calculated by counting the number of characters in the name. With the name and name length, the next step 42 is the construct the file identifier for the file resource. In this construction, the file location information (inode index, serial number) is placed at the beginning of the file of bytes that will be the FID. The next step is to append the length for the name and the actual name to the FID bytes in step 43. The FID can be viewed as an array of memory locations containing the serial number, the length of the name and the actual name located in consecutive memory locations at the beginning of the array. In the discussed example, the characters that spell "myfile" would be the name of the file placed after the name length. These three components comprise the stream of bytes for the FID. Step 44 sets the length parameter that is in the FID data structure to be equal to the length of the name plus the number of bytes it actually takes to write the serial number in the stream of bytes plus the number of bytes it actually takes to write the length of the name. This length is the total number of bytes that comprise the FID byte stream. The step writes that value into the length parameter of the Fid. This operation completes the construction of the FID. The FID is the returned to the caller in step 45.

Returning to the question in step 40 of whether the inode index or serial number the entry is equal to the inode index or serial number determined in step 37, if the answer is "No", then the process moves to step 46 and sets the next entry in the directory. Step 47, determines whether there are any more entries in the directory. If there are no more entries, then a FID can not be generated because there is not a directory entry for that resource, step 48. If the answer in step 47 is "Yes", then the procedure would return to step 39 read the next directory entry for this directory and repeat the process as described.

In summary, this technique described in FIG. 5 provides a way to generate a FID, when the native operating system does provide that service as described in FIG. 4. This FID construction combines a mostly-unique identification for the file usually in the form of a disk address or file system index and coupling that information with some unique information from the file, in this case the file name. Those two pieces of information together form a one-to-one relationship between that FID and the file resource that it represents. With this process, no other file resource in the system will have that representation. This representation will be the association mechanism for the external authorization policy.

Figure 6:
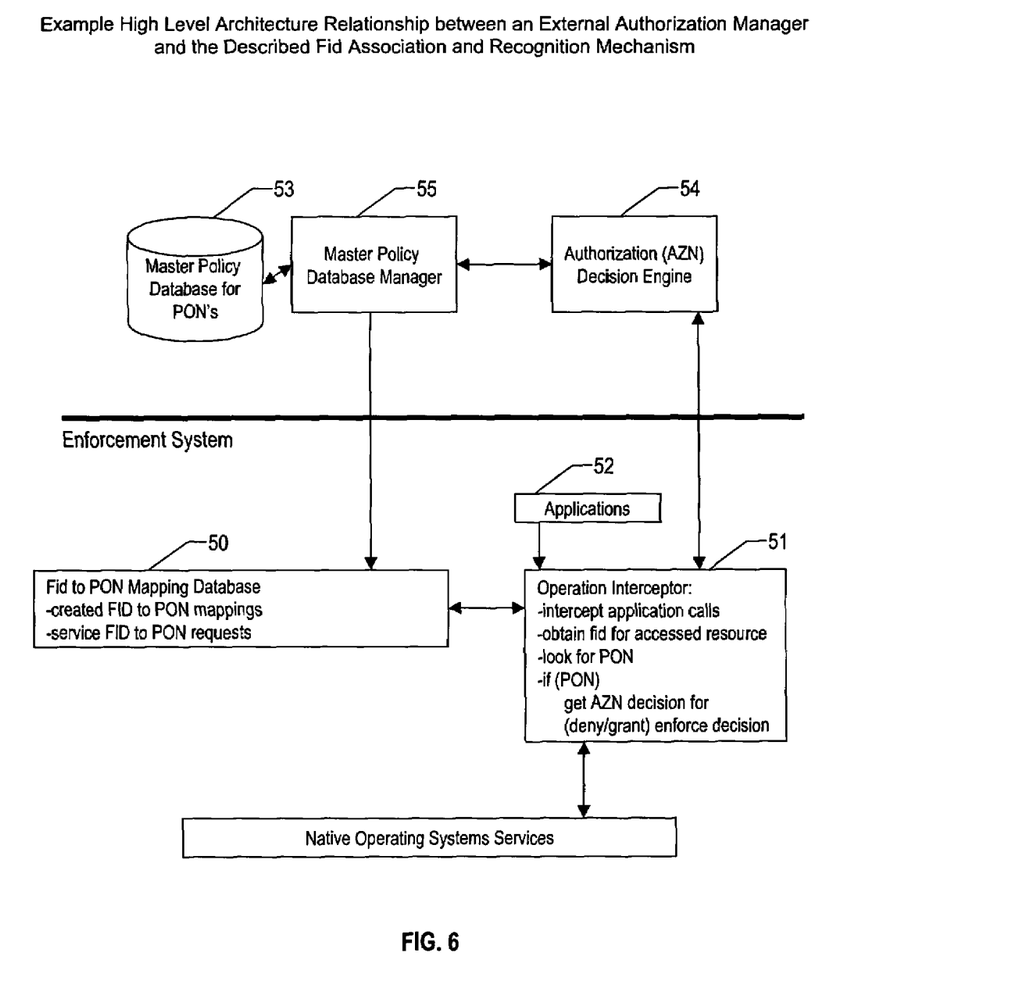
FIG. 6 is a block diagram of the high-level architecture relationship between an example authorization manager, a file system, and techniques of the present invention.

FIG. 6 illustrates the high-level architecture relationship between an authorization manager, a file system, and techniques of the present invention. In the architecture, Box 50 contains the file identifier to protected object name (PON) mapping database. Relevant algorithms would be the ones that create a FID, get a FID and create a mapping to the PON and for a FID, provide it as input and return a PON to a caller. Box 51 contains the operation interceptor component of the authorization security manager that would intervene in operations accessing the file system resources that the security manager will protect. This component would examine the FID-to-PON mapping database and determine if that file system resource is protected, and if that resource has external authorization policy on it. If the resource does have external authorization policy defined on it, this operation interceptor would grant or deny access to the file system resource. Box 52 represents the applications that run on the system and users of the system that are accessing the protected file system resources. Box 53 is the database location where the authorization policy and security rules. This database location could be a variety of places such as on a network computer or on the same system that enforces the rules. Conceptually, there is some medium that actually holds all of the rules. Box 54 represents a security access system decision engine. In this decision engine, logic actually exist that would take the input information and other information related to the access request and determine whether to grant the access request. This authorization decision engine at the implementation level is application dependent.

In this invention, the technique allows the policy to be defined in terms of human readable names called PONs, full path names to files. Box 53 only pertains to security rules in terms of these file names, the name that describes something. The Box 50 takes those names and translates the names of files into very unique descriptions of these files as they exist on the system. Box 51 takes any route to a file and converts that into a unique physical description called a FID. Box 51 also takes this FID and maps it back to a real file name and determines that file that an application is attempting to access. Box 54 gets a name and information about the accessor and determines whether to grant access based on the security rules for these human generic file system names. Boxes 53, 54, and 55 do not necessarily know that they are protecting files or the details of how the file associations operate.

Figure 7:
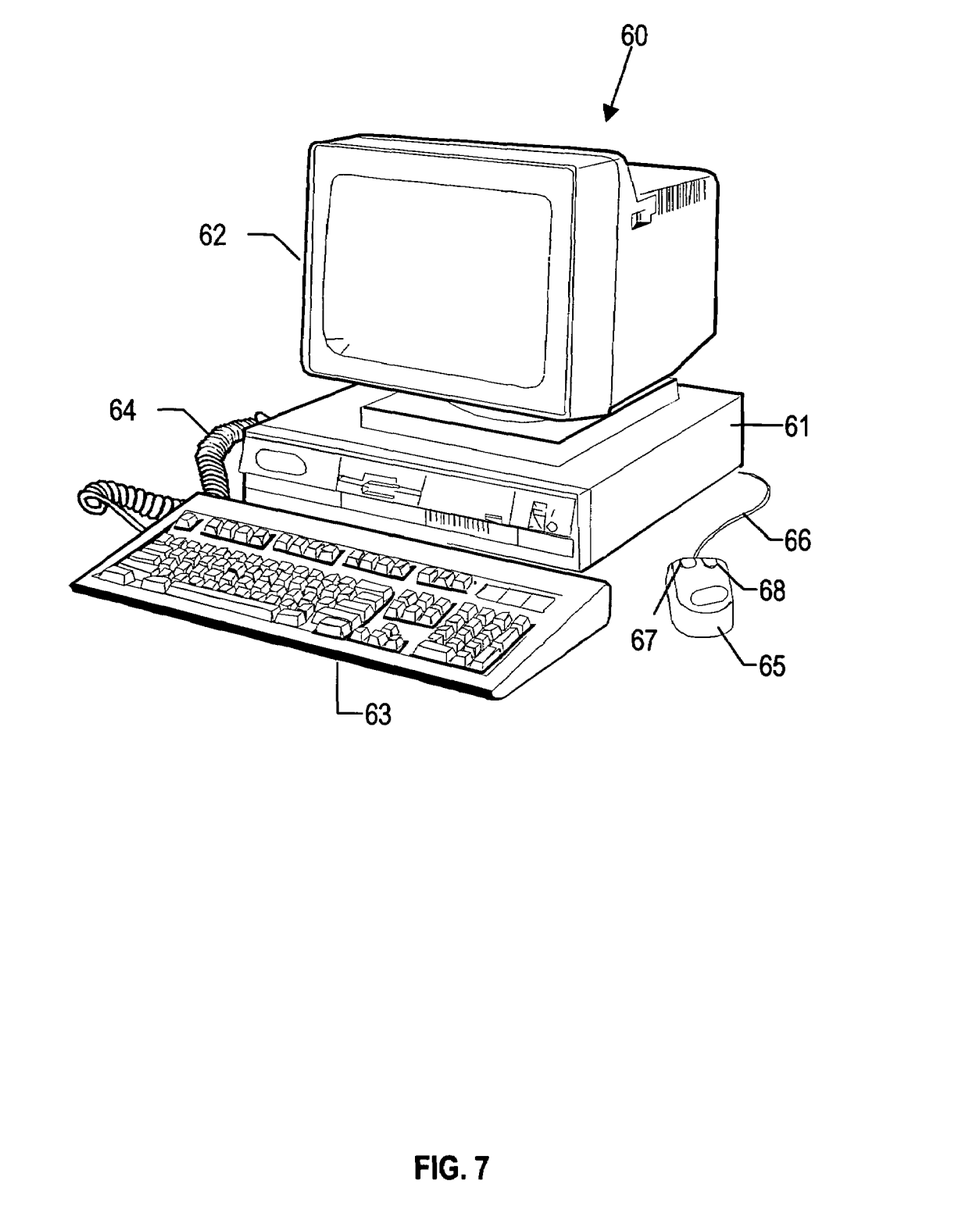
FIG. 7 is a pictorial representation of data processing system which may be used in implementation of the present invention.

FIG. 7 depicts a pictorial representation of data processing system 60 which may be used in implementation of the present invention. As may be seen, data processing system 60 includes processor 61 that preferably includes a graphics processor, memory device and central processor (not shown). Coupled to processor 61 is video display 62 which may be implemented utilizing either a color or monochromatic monitor, in a manner well known in the art. Also coupled to processor 61 is keyboard 63. Keyboard 63 preferably comprises a standard computer keyboard, which is coupled to the processor by means of cable 64. Also coupled to processor 61 is a graphical pointing device, such as mouse 65. Mouse 65 is coupled to processor 61, in a manner well known in the art, via cable 66. As is shown, mouse 65 may include left button 67, and right button 18, each of which may be depressed, or "clicked", to provide command and control signals to data processing system 60. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 60 may be implemented utilizing a personal computer.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

I claim:

1. A method external from a native operating system of a computer system for generating a file identifier for use in controlling access to file system resources in a computer system comprising the steps of:

generating a data structure having a pointer to an index related to a physical location of a file resource in the file system and a pointer to a directory containing a requested file resource, wherein the file resource and the directory are on a memory device;

obtaining a unique physical attribute of the file system object, by retrieving a serial number for a file location where a requested file system resource resides the file system location is retrieved from an inode or vnode index or from a serial number generated using a programming interface;

obtaining the name of the file system object, by opening the directory identified in the data structure, for each entry in the directory, reading the serial number for the file location, comparing said vnode or inode number to said serial number for the file location number and retrieving the file name of the resource out of the directory; and constructing a file identifier for that file system object from said obtained unique physical attribute and said file system object name, by coupling the unique physical attribute to the file system object name to produce the file identifier for a particular file system object.

2. The method as described in claim 1 wherein said file identifier construction step comprises placing the index number at the beginning of the bytes that will be the file identifier and appending the file name to the file of bytes.

3. The method as described in claim 1 further comprising after said comparing step, the steps of: retrieving the next entry in the directory when the said comparison is not equal; determining if this entry is the last entry; and proceeding to read said entry is not the last entry.

4. The method as described in claim 3 further comprising the step of returning no file identifier when no directory entry file serial number equals the index file space number.

5. A method external from a native operating system of a computer system for generating a file identifier for use in controlling access to file system resources in the computer system, the external file generating method comprising the steps:

obtaining an underlying object data pointer for a file system object;

obtaining an object pointer of for the parent directory of the file system object;

obtaining a physical file location number for the system object using the obtained underlying object data pointer for the system file object and the obtained object pointer of for the parent directory of the file system object, wherein the system object and the parent directory are on a memory device;

obtaining the file name for the system file object by using the data pointer for the parent directory by using the data pointer for the parent directory to open the directory;

obtaining a specific file serial number for the system file object using the physical file;

reading information contained in the directory to get a directory entry's serial number or node index;

determining whether there is a match between a serial number of an entry in the parent directory and the obtained serial number of the specific file system object;

when the determination is that the serial number of a directory entry is equal to the serial number of the specific file system object, retrieving the name of the entry in the directory and the length of that name;

constructing a file identifier for a file system resource of the file system object by placing the file serial number at the beginning of the file of bytes;

appending the length of the file name and file name to the constructed file identifier resulting in memory locations containing the serial number, the length of the file name and the file name in consecutive memory locations;

setting a file identifier length for the constructed file identifier to be equal to the length of the file name plus the number of bytes required for the serial number plus the number of byes required to write the length of the file name; and returning the newly constructed file identifier to the user.

* * * * *